United States Patent Office 3,492,131
Patented Jan. 27, 1970

3,492,131
PEPTIDE SWEETENING AGENTS
James M. Schlatter, Glenview, Ill., assignor to G. D. Searle & Co., Chicago, Ill., a corporation of Delaware
No Drawing. Filed Apr. 18, 1966, Ser. No. 543,054
Int. Cl. A23l 1/26
U.S. Cl. 99—141
12 Claims The present invention relates to novel compositions which are especially useful in view of their sweetening properties and to novel methods for the use of those compositions as sweetening agents.

The instant substances which exhibit this surprising sweetening property are dipeptide derivatives characterized by the following structural formula

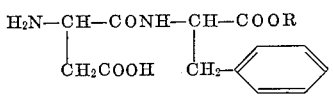

wherein R is a lower alkyl radical.

Illustrative of the lower alkyl radicals denoted by the R term are methyl, ethyl, propyl, butyl, pentyl, hexyl, heptyl and the branched-chain groups isomeric therewith.

The surprisingly potent sweet taste of these dipeptide derivatives is completely unexpected and could not have been predicted from a consideration of their chemical structure. That property apparently is related to the polarity of the molecule as indicated by the fact that the compounds wherein R is hydrogen, i.e. the corresponding free carboxylic acids, are completely lacking in sweetness.

The sweetening property of the dipeptide substances is dependent also upon the stereochemistry of the individual amino acids, i.e. aspartic acid and phenylalanine, from which the dipetides are derived. Each of the amino acids can exist in either the D or L form, but it has been determined that the L-aspartyl - L - phenylalanine esters are sweet while the corresponding D - D, D - L, and L-D isomers are not. Combinations of isomers which contain the L—L dipeptide, i.e. DL - aspartyl - L - phenylalanine, L - aspartyl - DL - phenylalanine and DL - aspartyl-DL-phenylalanine, are sweet also.

The instant sweetening agents exhibit a remarkably greater potency than does sucrose. The sweetness of an aqueous solution of L - aspartyl - L - phenylalanine methyl ester, for example, can be detected at a concentration between 0.5–1% of that of sucrose. In other words, that dipeptide derivative is 100–200 times as sweet as sucrose. The corresponding ethyl ester is 25–50 times as potent as sucrose. It is apparent also that the sweetening agents of the present invention will be particularly useful to diabetics. These dipeptide esters furthermore do not result in the unpleasant after-taste characteristic of synthetic sweeteners such as saccharin and cyclamate. In consequence of their derivation from natural sources, i.e. naturally occurring amino acids, the instant sweeteners are devoid of toxic properties.

The instant dipeptide esters are conveniently manufactured by methods suitable for the coupling of amino acids. An especially preferred starting material is the aspartic acid derivative wherein the amino function is protected by a benzyloxycarbonyl group and the β-carboxy function by a benzyl ester group, and the α-carboxy group is converted to a p-nitrophenyl ester function. The preparation of that substance, i.e., N-benzoyloxycarbonyl - L - aspartic acid α-p-nitrophenyl, β-benzyl diester, is described by S. Guttmann, Helv. Chim. Acta, 44, 721 (1961). When that substance is allowed to react with a phenylalanine ester, displacement of the more reactive p-nitrophenyl ester group occurs to afford the protected dipeptide of the following formula

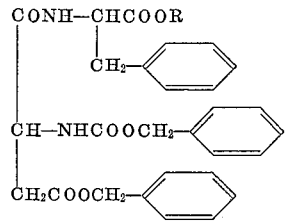

wherein R is a lower alkyl radical as exemplified above. Removal of the N-benzyloxycarbonyl and O-benzyl protecting groups is conveniently effected by hydrogenolysis at atmospheric pressure and room temperature, utilizing palladium as the catalyst. Those processes are specifically illustrated by the reaction of N-benzyloxycarbonyl - L - aspartic acid α - p - nitrophenyl, β - benzyl diester with L-phenylalanine methyl ester to afford β - benzyl N-benzyl - oxycarbonyl - L - aspartyl - L - phenylalanine methyl ester and hydrogenolysis of that intermediate in aqueous acetic acid with palladium metal catalyst to produce L-aspartyl - L - phenylalanine methyl ester.

The instant dipeptide sweetening agents are water soluble, stable substances which can be utilized in a variety of physical forms, e.g. as powders, tablets, syrups, etc. Liquid or solid carriers such as water, glycerol, starch, sorbitol, salt, citric acid and other suitable non-toxic substances can be utilized also. These compositions are particularly valuable as sweetening agents for edible materials. Examples of such materials are fruits, vegetables, juices, meat products such as ham or bacon, sweetened milk products, egg products, salad dressings, ice creams and sherbets, icings, syrups, cake mixes and beverages such as carbonated soft drinks and wines.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials are expressed in parts by weight except where otherwise noted.

EXAMPLE 1

A solution of 88.5 parts of L-phenylalanine methyl ester hydrochloride in 100 parts of water is neutralized by the addition of dilute aqueous potassium bicarbonate, then is extracted with approximately 900 parts of ethyl acetate. The resulting organic solution is washed with water and dried over anhydrous magnesium sulfate. To that solution is then added 200 parts of N-benzyloxycarbonyl - L - aspartic acid α - p - nitrophenyl, β - benzyl diester, and that reaction mixture is kept at room temperature for about 24 hours, then at approximately 65° for about 24 hours. The reaction mixture is cooled to room temperature, diluted with approximately 390 parts of cyclohexane, then cooled to approximately −18° in order to complete crystallization. The resulting crystalline product is isolated by filtration and dried to afford β - benzyl N - benzyloxycarbonyl - L - aspartyl - L-phenylalanine methyl ester, melting at about 118.5–119.5°.

EXAMPLE 2

A solution of 6.15 parts of L - phenylalanine n - propyl ester hydrochloride in 20 parts of water is neutralized by the addition of dilute aqueous potassium bicarbonate, then is extracted with approximately 45 parts of ethyl acetate. That organic solution is washed with water and dried over anhydrous magnesium sulfate. A quantity of N-benzyloxycarbonyl - L - aspartic acid α - p - nitrophenyl, β-benzyl diester amounting to 10.05 parts is added, and the resulting reaction mixture is kept at room temperature for about 5 days. Washing of that mixture successively with dilute hydrochloric acid, water, dilute aqueous potassium carbonate and water affords an organic solution which is dried over anhydrous magnesium sulfate, then evaporated to dryness under reduced pressure. The resulting solid residue is purified by recrystallization from cyclohexane - isopropyl acetate to yield β - benzyl N-benzyloxycarbonyl - L - aspartyl - L - phenylalanine n-propyl ester, which melts at about 90–91°.

EXAMPLE 3

When 8.2 parts of L - phenylalanine ethyl ester hydrochloride and 17.1 parts of N-benzyloxycarbonyl-L-aspartic acid α-p-nitrophenyl, β-benzyl diester are substituted in the procedure of Example 2, there is obtained a solid crude product, which is purified by recrystallization from isopropyl alcohol to afford β - benzyl N - benzyloxycarbonyl - L - aspartyl - L - phenylalanine ethyl ester, melting at about 89–94°.

EXAMPLE 4

When the procedure of Example 2 is repeated with the substitution of 6.15 parts of L-phenylalanine isopropyl ester hydrochloride, there is obtained a solid crude product which is purified by recrystallization from ethyl acetate-cyclohexane to yield β-benzyl N-benzyloxycarbonyl-L - aspartyl - L - phenylalanine isopropyl ester, melting at about 95–101°.

EXAMPLE 5

A solution containing 4.78 parts of N-benzyloxycarbonyl - L - aspartic acid α - p - nitrophenyl, β - benzyl diester and 2.63 parts of L-phenylalanine tertiarybutyl ester in 18 parts of ethyl acetate is stored at room temperature for about 6 days, then is washed successively with dilute hydrochloric acid, water, dilute aqueous potassium carbonate and water. Drying over anhydrous magnesium sulfate followed by evaporation of the solvent under reduced pressure affords the crude product, which is purified by recrystallization from hexane-carbon tetrachloride to yield β-benzyl N-benzyloxycarbonyl-L-aspartyl - L - phenylalanine tertiary - butyl ester, which melts at about 69–70.5°.

EXAMPLE 6

To a solution of 180 parts of β-benzyl N-benzyloxycarbonyl - L - aspartyl - L - phenylalanine methyl ester in 3,000 parts by volume of 75% acetic acid is added 18 parts of palladium black metal catalyst, and the resulting mixture is shaken with hydrogen at atmospheric pressure and room temperature for about 12 hours. The catalyst is removed by filtration, and the solvent is distilled under reduced pressure to afford a solid residue, which is purified by recrystallization from aqueous ethanol to yield L-aspartyl-L-phenylalanine methyl ester. It displays a double melting point at about 190° and 245–247°.

EXAMPLE 7

A mixture containing 9.6 parts of β-benzyl N-benzyloxycarbonyl-L-aspartyl-L-phenylalanine ethyl ester, one part of palladium black metal catalyst and 1,000 parts by volume of 75% acetic acid is shaken with hydrogen at atmospheric pressure and room temperature for about 2 hours. The catalyst is removed by filtration, and the resulting filtrate is distilled to dryness under reduced pressure. Recrystallization of the solid residue from water affords L-aspartyl-L-phenylalanine ethyl ester, which exhibits a double melting point at about 184° and 245–246°.

EXAMPLE 8

A mixture containing 5.3 parts of β-benzyl N-benzyloxycarbonyl-L-aspartyl-L-phenylalanine n-propyl ester and 0.5 part of palladium black metal catalyst with 100 parts by volume of 75% acetic acid is shaken with hydrogen at atmospheric pressure and room temperature for about 1½ hours, at the end of which time the catalyst is removed by filtration. The resulting filtrate is stripped of solvent by distillation under reduced pressure, and the resulting residue is purified by recrystallization from aqueous methanol to yield L-aspartyl-L-phenylalanine n-propyl ester. This compound exhibits a double melting point at about 155–160° and 242–245°.

EXAMPLE 9

When 7 parts of β-benzyl N-benzyloxycarbonyl-L-aspartyl-L-phenylalanine isopropyl ester is hydrogenated according to the procedure of Example 8, there is produced L-aspartyl-L-phenylalanine isopropyl ester. This compound exhibits a double melting point at about 180–181° and 232–235°.

EXAMPLE 10

To a solution of 2.2 parts of β-benzyl N-benzyloxycarbonyl-L-aspartyl-L-phenylalanine tertiary-butyl ester in 75 parts by volume of 75% acetic acid is added 0.2 part of palladium black metal catalyst, and that reaction mixture is shaken with hydrogen at atmospheric pressure and room temperature for about one hour. Following that reaction period, the catalyst is removed by filtration, and the solvent is evaporated under reduced pressure to afford a solid residue. That residue is dissolved in hot water, then lyophilized to afford L-aspartyl-L-phenylalanine tertiary-butyl ester, melting at about 143–148°.

EXAMPLE 11

When an equivalent quantity of DL-phenylalanine methyl ester is substituted in the procedure of Example 1, there is produced a mixture of β-benzyl N-benzyloxycarbonyl-L-aspartyl-L-phenylalanine methyl ester and β-benzyl N - benzyloxycarbonyl-L-aspartyl-D-phenylalanine methyl ester.

EXAMPLE 12

The substitution of an equivalent quantity of N-benzyloxycarbonyl-DL-aspartic acid α-p-nitrophenyl, β-benzyl diester in the procedure of Example 1 affords a mixture of β - benzyl N - benzyloxycarbonyl - L-aspartyl-L-phenylalanine methyl ester and β-benzyl N-benzyloxycarbonyl-D-aspartyl-L-phenylalanine methyl ester.

EXAMPLE 13

The substitution of equivalent quantities of N-benzyloxycarbonyl-DL-aspartic acid α-p-nitrophenyl, β-benzyl diester and DL-phenylalanine in the procedure of Example 1 results in a mixture of β-benzyl N-benzyloxycarbonyl-DL-aspartyl-DL-phenylalanine methyl ester and β-benzyl N - benzyloxycarbonyl - DL - aspartyl-LD-phenylalanine methyl ester.

EXAMPLE 14

By substituting an equivalent quantity of the mixture of β-benzyl N-benzyloxycarbonyl - L - aspartyl-L-phenylalanine methyl ester and β-benzyl N-benzyloxycarbonyl-L-aspartyl-D-phenylalanine methyl ester and otherwise proceeding according to the processes of Example 6, there is produced a mixture of L-aspartyl-L-phenylalanine methyl ester and L-aspartyl-D-phenylalanine methyl ester.

EXAMPLE 15

When an equivalent quantity of the mixture of β-benzyl N-benzyloxycarbonyl-L-aspartyl-L - phenylalanine methyl ester and β - benzyl N - benzyloxycarbonyl-D-aspartyl-L-phenylalanine methyl ester is substituted in the procedure of Example 6, there is produced a mixture of L-aspartyl-L-phenylalanine methyl ester and D-aspartyl-L-phenylalanine methyl ester.

EXAMPLE 16

The substitution of an equivalent quantity of the mixture of β-benzyl N-benzyloxycarbonyl-DL-aspartyl-DL-phenylalanine methyl ester and β-benzyl N-benzyloxycarbonyl-DL-aspartyl-LD-phenylalanine methyl ester in the procedure of Example 6 results in a mixture of DL-aspartyl-DL-phenylalanine methyl ester and DL-aspartyl-LD-phenylalanine methyl ester.

What is claimed is:

1. A composition for the sweenening of edible materials which comprises a compound selected from the group consisting of aspartylphenylalanine methyl ester, aspartylphenylalanine ethyl ester, aspartyphenylalanine n-propyl ester, aspartylphenylalanine isopropyl ester and aspartylphenylalanine tertiary-butyl ester, wherein the stereochemical configuration is L—L, DL—DL, DL—L or L—DL, in an amount which will afford the degree of sweetness desired, together with an non-toxic carrier.

2. The composition of claim 1 wherein the compound is L-aspartyl-L-phenylalanine methyl ester in the amount which will afford the degree of sweetness effected by 100–200 times that amount of sucrose.

3. The composition of claim 1 wherein the claimed compound is L-aspartyl-L-phenylalanine ethyl ester in the amount which will afford the degree of sweetness effected by 25–50 times that amount of sucrose.

4. The composition of claim 1 wherein the compound is L-aspartyl-L-phenylalnaine n-propyl ester.

5. The composition of claim 1 wherein the compound is L-aspartyl-L-phenylalanine isopropyl ester.

6. The composition of claim 1 wherein the compound is L-aspartyl-L-phenylalanine n-propyl ester.

7. A method for sweetening edible materials which comprises adding thereto an effective amount of a compound of the formula

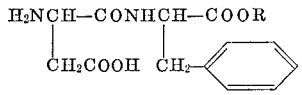

wherein R is a lower alkyl radical and the stereochemical configuration is DL—DL, DL—L, L—DL or L—L.

8. The method of claim 7 wherein the compound is L-aspartyl-L-phenylalanine methyl ester.

9. The method of claim 7 wherein the compound is L-aspartyl-L-phenylalanine ethyl ester.

10. The method of claim 7 wherein the compound is L-aspartyl-L-phenylalanine n-propyl ester.

11. The method of claim 7 wherein the compound is L-aspartyl-L-phenylalanine isopropyl ester.

12. The method of claim 7 wherein the compound is L-aspartyl-L-phenylalanine tertiary-butyl ester.

References Cited

UNITED STATES PATENTS 2,789,997  4/1957  Sahyun _____ 99—141

OTHER REFERENCES

Morley: "Nature" vol. 204, Dec. 5, 1964, page 934.

RAYMOND N. JONES, Primary Examiner.

U.S. Cl. X.R.

260—112.5

PO-1050
(5/69)

UNITED STATES PATENT OFFICE
CERTIFICATE OF CORRECTION

Patent No. 3,492,131    Dated Jan. 27, 1970

Inventor(s) James M. Schlatter

It is certified that error appears in the above-identified patent and that said Letters Patent are hereby corrected as shown below:

Column 2, line 22, "catayst" should be -- catalyst --.

Column 5, line 33, "phenylalnaine" should be -- phenylalanine --

Column 6, line 2, "phenylalanine n-propyl ester" should be -- phenylalanine tertiary-butyl ester --.

SIGNED AND
SEALED

JUL 14 1970

(SEAL)
Attest:

Edward M. Fletcher, Jr.
Attesting Officer

WILLIAM E. SCHUYLER, JR.
Commissioner of Patents